(12) United States Patent
De Groen et al.

(10) Patent No.: US 11,297,973 B2
(45) Date of Patent: Apr. 12, 2022

(54) DECOCTION DEVICE AND EXTRACTION APPARATUS

(71) Applicant: J.M. DE JONG DUKE AUTOMATENFABRIEK B.V., Sliedrecht (NL)

(72) Inventors: Cornelis De Groen, Hendrik Ido Ambacht (NL); Eduard Adri Brijder, Gorinchem (NL)

(73) Assignee: J.M. DE JONG DUKE AUTOMATENFABRIEK B.V., Sliedrecht (NL)

( * ) Notice: Subject to any disclaimer, the term of this patent is extended or adjusted under 35 U.S.C. 154(b) by 203 days.

(21) Appl. No.: 16/163,834

(22) Filed: Oct. 18, 2018

(65) Prior Publication Data

US 2019/0117007 A1 Apr. 25, 2019

(30) Foreign Application Priority Data

Oct. 20, 2017 (NL) .................................. NL2019777

(51) Int. Cl.
*A47J 31/36* (2006.01)
*A47J 31/40* (2006.01)
(Continued)

(52) U.S. Cl.
CPC ....... *A47J 31/3614* (2013.01); *A47J 31/0647* (2013.01); *A47J 31/3619* (2013.01);
(Continued)

(58) Field of Classification Search
CPC ................ A47J 31/0647; A47J 31/3609; A47J 31/3614; A47J 31/3619; A47J 31/3671; A47J 31/405
See application file for complete search history.

(56) References Cited

U.S. PATENT DOCUMENTS 4,172,669 A 10/1979 Edelbach
4,206,694 A * 6/1980 Moskowitz ......... A47J 31/0647
99/295
(Continued)

FOREIGN PATENT DOCUMENTS

DE 202011005003 U1 8/2011
DE 10201600215 A1 8/2017
(Continued)

*Primary Examiner* — Reginald Alexander
(74) *Attorney, Agent, or Firm* — Alan F. Feeney; PCK IP Lawyers (USA) P.C.

(57) ABSTRACT

A decoction device for an extraction apparatus, in particular for preparing espresso, comprises a decoction chamber (7) enclosed by a chamber wall (5) for receiving a quantity of powder therein. The decoction chamber is situated between a first chamber bottom (20) and a second chamber bottom (30). The first chamber bottom (20) is coupled to a linear actuator and is axially movable in the decoction chamber so as to compress the powder to a bed. A drive is provided to impose a relative rotation between one of the chamber bottoms and the chamber wall as the chamber bottoms (20,30) approach each other. The respective chamber bottom (30) is for this purpose rotatable within the chamber wall (5) and the drive is able and configured to impose a rotation thereon during an approach movement of the first chamber bottom (20). A slip coupling (60) is provided in the transmission.

12 Claims, 2 Drawing Sheets

(51) Int. Cl.
*A47J 31/06* (2006.01)
*B65D 85/804* (2006.01)

(52) U.S. Cl.
CPC ....... *A47J 31/3671* (2013.01); *A47J 31/3695* (2013.01); *A47J 31/405* (2013.01); *B65D 85/8043* (2013.01)

(56) References Cited

U.S. PATENT DOCUMENTS

| | | | |
|---|---|---|---|
| 8,124,150 B2* | 2/2012 | Doglioni Majer | A47J 31/5253 426/231 |
| 2003/0047080 A1 | 3/2003 | Wu | |
| 2010/0266739 A1* | 10/2010 | van Hattem | A47J 31/22 426/433 |
| 2010/0294135 A1* | 11/2010 | Weissman | A47J 31/20 99/287 |

FOREIGN PATENT DOCUMENTS

| | | |
|---|---|---|
| EP | 0496242 A1 | 7/1992 |
| EP | 0659377 A1 | 6/1995 |
| EP | 2474253 A1 | 7/2012 |
| GB | 2273864 A | 7/1994 |
| WO | WO-2014077687 A1 | 5/2014 |

\* cited by examiner

DECOCTION DEVICE AND EXTRACTION APPARATUS

CROSS-REFERENCE TO RELATED APPLICATIONS

This application claims priority to Dutch National Application No. NL2019777 filed on Oct. 20, 2017, the entire contents of which is incorporated herein by reference.

The present invention relates to a decoction device for an extraction apparatus, in particular for preparing espresso, comprising a decoction chamber enclosed by a chamber wall for receiving a quantity of powder therein, which decoction chamber extends longitudinally between a first chamber bottom and a second chamber bottom, wherein at least the first chamber bottom is coupled to a linear actuator and is axially movable in the decoction chamber so as to compress the powder in the decoction chamber to a bed, and wherein a drive is provided to impose a relative rotation between at least one of the chamber bottoms and the chamber wall as the chamber bottoms approach each other.

Such a decoction device is known from the European patent EP 2.474.253. Described herein is a coffee machine with a decoction device which is placed at an angle therein. The decoction device comprises a decoction chamber inside a cylindrical chamber wall which is provided about halfway along with a feed opening for the supply of a quantity of coffee powder. The decoction chamber is bounded on either side by a first and a second chamber bottom respectively. The first chamber bottom here comprises a piston on an outer end of a piston rod which, prior to admission of hot water, makes an axial inward stroke in order to press the coffee powder to a compact bed against the second chamber bottom. This latter is provided with a filter and an outflow port from which a coffee extract, usually referred to as espresso, can exit after hot water has been carried from an opposite side at increased pressure through the coffee bed.

It is important here that the coffee powder is distributed uniformly in the bed and compressed homogeneously so as to enhance uniform distribution of the hot water over the coffee bed. This not only saves coffee, it also improves the flavour, quality and uniformity of the prepared extract. In the known device the piston rod is provided for this purpose with a helical groove with which a cam extending from the chamber wall is in engagement. During an axial movement of the piston rod a rotation is thus superimposed thereon which results in a corresponding rotation of the first chamber bottom during compacting of the coffee bed. The coffee powder is hereby entrained and is thus better distributed over the surface of the chamber bottom.

Although an improved homogeneity is thus obtained in the coffee bed, the known device has the drawback that two movements are performed simultaneously by the piston rod, viz. a translation and a rotation. During the approach to the second chamber bottom and the compaction of the coffee bed this rotation will be particularly subject to a high resistance which is manifested as a high torsion, and thus high load, on the piston rod. This must therefore be given a relatively heavy form so that it does not collapse at some point under this load. Furthermore, both the movements are inevitably directly linked to each other and influence each other in the known device, this also limiting the freedom in design of the machine.

The present invention therefore has for its object, among others, to provide a decoction device which obviates these and other drawbacks to at least significant extent.

In order to achieve the stated object, a decoction device of the type described in the preamble has the feature according to a first aspect of the invention that the second chamber bottom is rotatable within the chamber wall, and that the drive is able and configured to impose a relative rotation between the second chamber bottom and the chamber wall during an approach movement of the first chamber bottom. According to the invention it is therefore not so much the first chamber bottom, which performs an axial translation in order to compress the powder to a compact bed, which is set into rotation, but rather that a rotation is imposed on the second chamber bottom relative to the chamber wall. Setting either the second chamber bottom or the chamber wall into rotation during forming of the coffee bed achieves that the powder is entrained thereby and will be better distributed over the surface of the chamber bottoms without this having to result in an additional load on the first chamber bottom and the actuator coupled thereto. Both movements are thus in principle separate of each other and can therefore be imposed moreover to at least greater extent independently of each other.

The decoction device can be provided here with a drive which is wholly independent of the drive of the first chamber bottom. However, from the viewpoint of saving materials, components, dimensions and cost, a preferred embodiment of the decoction device according to the invention has the feature that the drive comprises a transmission to the actuator of the first chamber bottom. While the rotation of the second chamber bottom relative to the chamber wall is thus linked to the actuator which provides for driving of the first chamber bottom, the transmission placed therebetween will nevertheless provide sufficient freedom of design for an optimal rotation (speed) relative to the linear movement of the first chamber bottom, with a view to an ideal powder distribution.

A particular embodiment of the decoction device according to the invention has the feature here that the transmission comprises a gearwheel transmission and that the actuator comprises a screw spindle. While the rotation of the second chamber bottom is derived here from that of the screw spindle, with a suitable choice of gearwheel and gear ratio it can nevertheless be adjusted with more freedom and adapted to an optimal powder distribution over the surface between the two chamber bottoms. Furthermore, such a setting of the transmission ratio can optionally also be controlled dynamically if desired, for instance by means of conical transmission members which are axially extendable.

From a practical viewpoint it is preferred to link the rotation of the rotating chamber bottom to the actuator. The decoction device thus requires only a single coupling to a motor and only one motor for energizing both movements which have to be performed by the chamber bottoms. This moreover results in space-saving and a saving on components. In order to counter overload of the actuator here resulting from excessive friction of the rotating chamber bottom on the coffee bed when it is being compressed between the two chamber bottoms, a decoction device of the type described in the preamble has the feature according to a second aspect of the invention that the drive comprises a transmission to the actuator and that a slip coupling is received in the drive. Such a slip coupling limits the force which will be transmitted by the transmission and thereby provides a safety mechanism against overload of this transmission, the actuator and/or a motor coupled thereto. Up to that moment the rotation applied thereby will nevertheless have ensured a homogeneous distribution of the powder over the surface of the powder bed.

In a particular embodiment the decoction device has the feature according to the invention that a slip coupling is received in the drive and that the slip coupling comprises a set of friction bodies which lie under pressure against each other transversely of a drive line, in particular under a spring pressure of spring means. A maximum drive torque is thus determined by a relative friction between the two friction bodies in combination with a bias of the spring means. This latter can optionally be mechanically and/or electronically adjustable here.

The invention also relates to an extraction apparatus, in particular a coffee machine, provided with such a decoction device, and will be further elucidated hereinbelow with reference to an exemplary embodiment and an accompanying drawing. In the drawing.

It is otherwise noted here that the figures are purely schematic and not always drawn to (the same) scale. Some dimensions in particular may be exaggerated to greater or lesser extent for the sake of clarity. Corresponding parts are designated in the figures with the same reference numeral.

Figure 1:
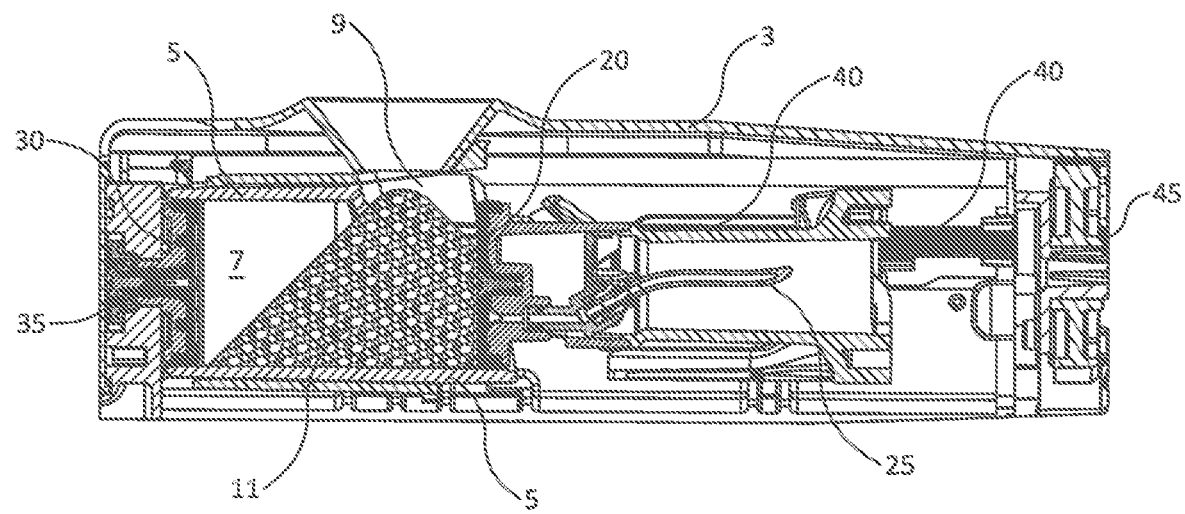
FIG. 1 shows a longitudinal section of an exemplary embodiment of a decoction device according to the invention.

FIG. 1 shows in side view a cross-section of an exemplary embodiment of a decoction device according to the invention. This decoction device is applied substantially in a horizontal orientation in an extraction machine; in this example a coffee machine for preparing espresso coffee and coffee specialties possibly derived therefrom, such as for instance lungo and cappuccino. The decoction device comprises a plastic housing 3 which provides space for a cylindrical decoction chamber 7 enclosed by a chamber wall 5. Provided in the chamber wall 5 with a view to supply of coffee powder into decoction chamber 7 is a supply opening 9 through which a measured quantity of ground coffee can be introduced into the decoction chamber. Because of the horizontal orientation of the decoction device this results in the forming of a characteristic powder heap 11 as shown by way of illustration in the figure.

The decoction chamber is bound on either side by a first chamber bottom 20 and a second chamber bottom 30. First chamber bottom 20 is axially movable and coupled to a linear actuator 40 in the form of a set of screw spindles, one of which is shown in the figure. The screw spindles are driven by a motor of the extraction apparatus in which the decoction device will be placed, which motor is located outside the decoction device and therefore not further shown. The decoction device comprises for this purpose a motor connection 45 on an outer end of screw spindles 40. The first chamber bottom is moreover provided with supply means for the feed and passage of hot water. The supply means comprise a hot water connection 25 to which a water conduit of the extraction apparatus can be coupled and supplied during operation by a hot water supply and a pump of the extraction apparatus. Hot water is hereby delivered under increased pressure and guided into decoction chamber 7 via a passage opening provided for the purpose in the first chamber bottom.

Second chamber bottom 30 comprises a coffee filter 33 and an outflow opening 35 through which the extract to be prepared can exit while powder 11 remains behind in the decoction chamber. Provided outside the plane of the drawing on the opening is a hose coupling for an outlet conduit leading to an outflow of the apparatus where the product can be taken away by the user.

The powder 11 has already been compressed to a cohesive bed, i.e. before extraction, in that the first chamber bottom 20 has been extended axially by actuator 40, carrying the coffee powder 11 with it. The thus compressed coffee bed allows, in combination with an adequate pump capacity, a pressure build-up which is sufficient to extract a so-called espresso coffee. It is desirable here that powder 11 is distributed uniformly over the bed so that the hot water is guided uniformly therethrough.

Figure 2:
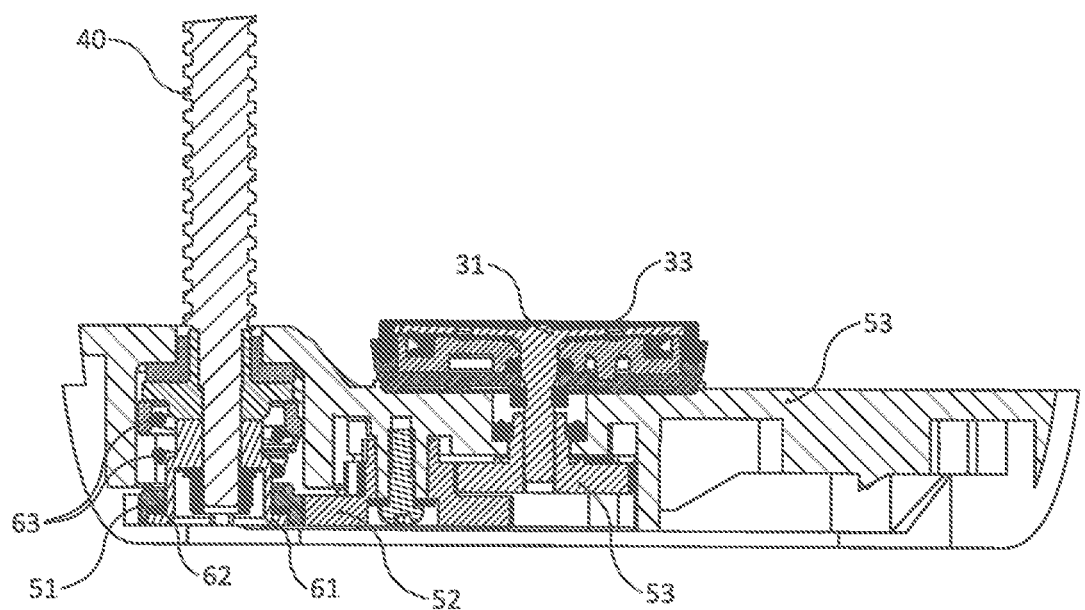
FIG. 2 shows a cross-section of a (transmission) part of the decoction device of FIG. 1.
Figure 3:
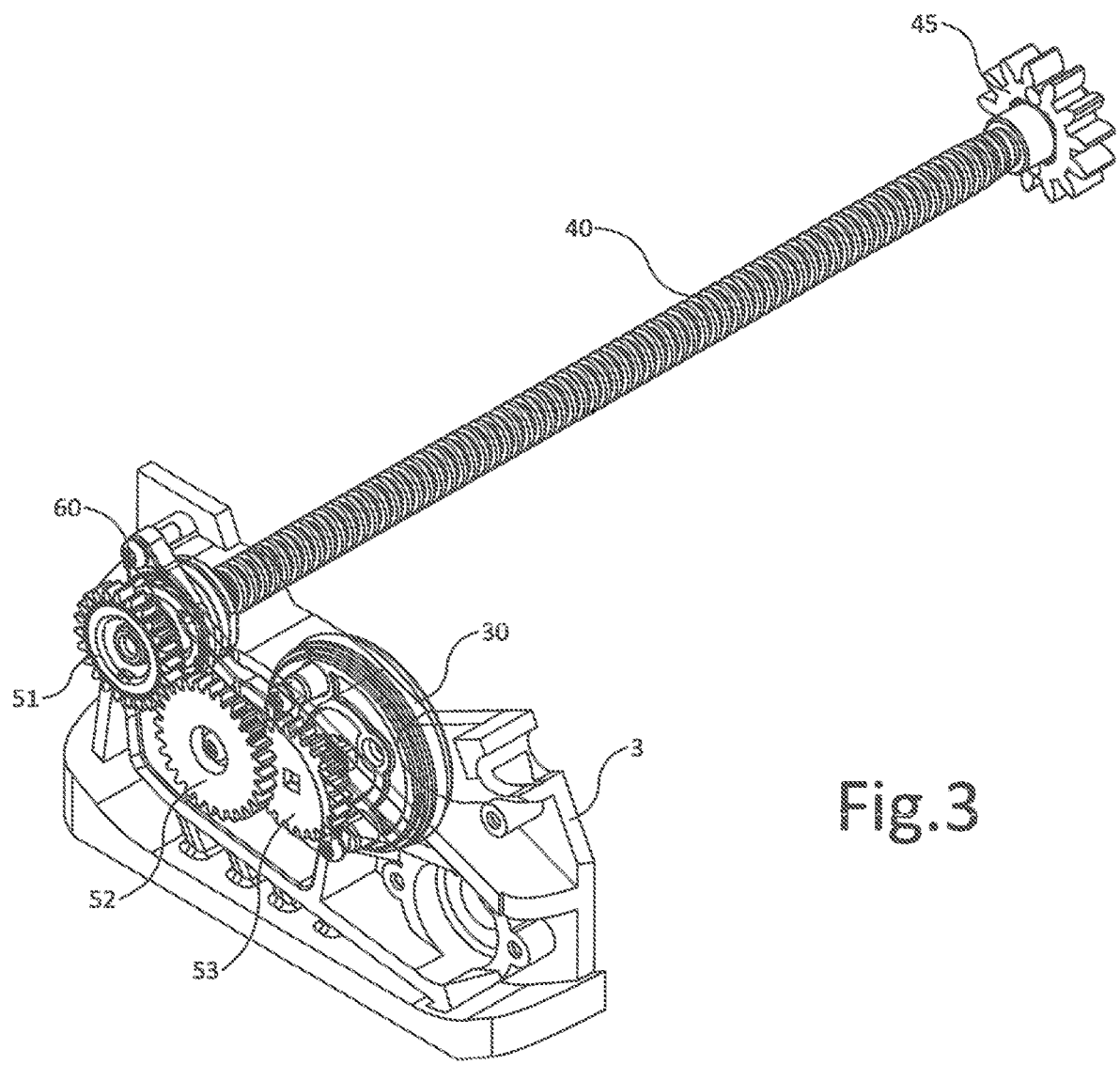
FIG. 3 is a perspective view of the part in FIG. 2.

Provided for this purpose is a drive which in this example, see also FIGS. 2 and 3, is coupled to second chamber bottom 30 in order to impose a rotation thereon as it approaches first chamber bottom 20. The rotating filter is driven by being coupled to one of the two spindles 40 already being used to drive the basic mechanism of the decoction device. During the movement of the opposite chamber bottom 20 the rotating chamber bottom 30 will ensure that a uniformly distributed coffee bed results.

In this example this drive comprises a gearwheel transmission 51 . . . 53 to one of the screw spindles 40. With a suitable transmission ratio of the gearwheels 51 . . . 53 an appropriate rotation speed can be imparted here to second chamber bottom 30 with a view to an optimal distribution of the coffee powder 11 in the coffee bed. Further contributing hereto is a relief which can be provided on the main surface of the second chamber bottom facing toward first chamber bottom 20.

Provided for the purpose of avoiding overload of the motor, spindles 40 and gearwheel transmission 51 . . . 53 between spindles 40 and the rotating chamber bottom 30 is a slip coupling 60. This latter ensures that the coffee bed can be further compacted once it has been uniformly distributed. Because of this coupling the rotating chamber bottom 30 ceases to rotate when the resistance of the coffee bed becomes too high. This mechanism is mounted in the front frame of the decoction system further shown in FIGS. 2 and 3. Slip coupling 60 is mounted directly onto spindle 40. The slip coupling consists of bush 61, a gearwheel 51, a slide plate 62 and a spring 63. Via an intermediate gearwheel 52 the rotation of spindle 40 is transmitted to a central gearwheel 53 mounted on the chamber bottom 30 to be rotated. This chamber bottom 30 comprises a filter carrier 31 and a filter 33, and is therefore also referred to simply as filter.

All in all, a particularly effective and reliable decoction device is hereby provided, in particular for a coffee machine, with which a better coffee quality and uniformity can be achieved.

Although the invention has been further elucidated above with reference to only a single exemplary embodiment, it will be apparent that the invention is by no means limited thereto. On the contrary, many variations and embodiments are still possible within the scope of the invention for a person with ordinary skill in the art.

We claim:

1. A decoction device for an extraction apparatus, in particular for preparing espresso, comprising a decoction chamber enclosed by a chamber wall for receiving a quantity of powder therein, which decoction chamber extends longitudinally between a first chamber bottom and a second chamber bottom, wherein at least the first chamber bottom is coupled to a linear actuator and is axially movable in the decoction chamber so as to compress the powder in the decoction chamber to a bed, and wherein a drive is provided to impose a relative rotation between at least one of the chamber bottoms and the chamber wall as the chamber bottoms approach each other, wherein the second chamber bottom is rotatable within the chamber wall, and wherein the drive is coupled to the second chamber bottom to impose a relative rotation by the second chamber bottom with respect to the chamber wall during an approach movement of the first chamber bottom.

2. The decoction device as claimed in claim 1, wherein the drive comprises a transmission to the actuator of the first chamber bottom.

3. The decoction device as claimed in claim 2, wherein the transmission comprises a gearwheel transmission and that the actuator comprises a screw spindle.

4. The decoction device as claimed in one or more of the foregoing claims, wherein the second chamber bottom is coupled via a slip coupling to the drive.

5. The decoction device as claimed in claim 4, wherein the slip coupling comprises a set of friction bodies which lie under pressure against each other transversely of a drive line, in particular under a spring pressure of spring means.

6. A decoction device according to claim 1, wherein the drive comprises a transmission to the actuator and that said transmission comprises a slip coupling.

7. The decoction device as claimed in claim 6, wherein the slip coupling comprises a set of friction bodies which lie against each other transversely of a drive line under pressure, in particular under a spring pressure of spring means.

8. The decoction device as claimed in claim 6 or 7, wherein the transmission comprises a gearwheel transmission to a chamber bottom driven thereby and that the actuator comprises a screw spindle.

9. The decoction device as claimed in claim 6, wherein the at least one of the chamber bottoms bears a relief on a main surface facing toward the other chamber bottom.

10. An extraction apparatus, in particular a coffee machine, comprising a decoction device as claimed in claim 6.

11. The decoction device as claimed in claim 6, wherein the at least one of the chamber bottoms bears a relief on a main surface facing toward the other chamber bottom.

12. An extraction apparatus, in particular a coffee machine, comprising a decoction device as claimed in claim 6.

* * * * *